US008219266B2

(12) United States Patent
Puig et al.

(10) Patent No.: US 8,219,266 B2
(45) Date of Patent: Jul. 10, 2012

(54) METHOD AND DEVICE FOR REDUCING ON AN AIRCRAFT LATERAL EFFECTS OF A TURBULENCE

(75) Inventors: Stephane Puig, Lauzerville (FR); Romeo Byzery, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 647 days.

(21) Appl. No.: 12/368,139

(22) Filed: Feb. 9, 2009

(65) Prior Publication Data

US 2010/0070114 A1    Mar. 18, 2010

(30) Foreign Application Priority Data

Feb. 11, 2008    (FR) ...................................... 08 00701

(51) Int. Cl.
*B64C 13/16*    (2006.01)
*G05D 1/08*    (2006.01)

(52) U.S. Cl. ............... 701/10; 701/7; 701/11; 244/76 C; 244/177; 244/194

(58) Field of Classification Search .................... 701/10; 244/76 C, 178
See application file for complete search history.

(56) References Cited

U.S. PATENT DOCUMENTS

| | | | | |
|---|---|---|---|---|
| 3,007,656 | A | | 11/1961 | Miller |
| 3,636,324 | A | * | 1/1972 | Dommasch ........................ 701/3 |
| 4,591,113 | A | * | 5/1986 | Mabey ........................ 244/76 C |
| 4,964,599 | A | * | 10/1990 | Farineau ........................ 244/195 |
| 5,050,086 | A | * | 9/1991 | Lambregts ........................ 701/4 |
| 5,375,794 | A | * | 12/1994 | Bleeg ........................ 244/76 C |
| 5,669,582 | A | * | 9/1997 | Bryant et al. ............... 244/76 C |
| 6,095,459 | A | | 8/2000 | Codina |
| 6,453,221 | B2 | * | 9/2002 | Burson ........................ 701/3 |
| 6,751,532 | B2 | * | 6/2004 | Inokuchi ........................ 701/14 |
| 7,523,657 | B2 | * | 4/2009 | Bommier et al. .......... 73/170.02 |
| 7,757,993 | B1 | * | 7/2010 | Hahn ........................ 244/195 |
| 2007/0260366 | A1 | * | 11/2007 | Lacaze et al. ........................ 701/3 |
| 2008/0251648 | A1 | | 10/2008 | Colomer |

(Continued)

FOREIGN PATENT DOCUMENTS

EP    0 293 018    11/1988

(Continued)

OTHER PUBLICATIONS

Perkins et al., Airplane Performance Stability and Control, 1949, John Wiley & Sons Inc., p. 316.*

(Continued)

*Primary Examiner* — Thomas G. Black
*Assistant Examiner* — Lindsay M Browder
(74) *Attorney, Agent, or Firm* — Dickinson Wright PLLC (57) ABSTRACT

Disclosed is a method and device for attenuating lateral effects on an aircraft due to turbulence encountered by the aircraft during flight. The lateral effects are attenuated by applying a roll control order to control a first controllable movable member that acts on aircraft roll and minimizes aircraft roll-wise disturbances due to wind, and a yaw control order that controls a second controllable movable member to act on aircraft yaw. The roll and yaw control orders are calculated based on a sideslip value of the aircraft, while the yaw control order is calculated as a function of the roll control order to compensate for aircraft lateral effects due to turbulence, as well as lateral effects due to application of the roll control order to the first movable member.

12 Claims, 2 Drawing Sheets

U.S. PATENT DOCUMENTS

2009/0048723 A1* 2/2009 Nugent et al. ................... 701/10
2009/0132104 A1* 5/2009 Rupnik et al. .................... 701/6

FOREIGN PATENT DOCUMENTS

| FR | 05 10341 | 10/2005 | |
| WO | 2007/042652 | 4/2007 | |
| WO | WO2007/042652 | * | 4/2007 |

OTHER PUBLICATIONS

J. Goslin, et al.: "An optimized yaw damper for enhanced passenger ride comfort,", Jun. 1, 1987, pp. 395-396, XP031105701.

* cited by examiner

Fig. 1

Fig. 2

METHOD AND DEVICE FOR REDUCING ON AN AIRCRAFT LATERAL EFFECTS OF A TURBULENCE

FIELD OF THE INVENTION

The present invention relates to a method and a device for attenuating on an aircraft, in particular a transport airplane, the lateral effects engendered by at least one turbulence encountered by this aircraft in the course of a flight. The lateral effects that the present invention proposes to deal with relate to disturbances in terms of roll moments, which can create discomfort for pilots and passengers, and in the most extreme cases act negatively on the safety of the aircraft.

BACKGROUND OF THE INVENTION

It is known that in the course of a flight, violent turbulence related to vertical wind gusts can cause at the aircraft level:
significant variations in vertical acceleration which, when they are negative, may injure passengers of the aircraft;
a significant swerve of the aircraft in terms of altitude, thereby increasing the risk of collision with another aircraft;
spikes in the lift on the airfoil, which test the load limit of the latter; and
roll moments, as well as lateral accelerations, which may also injure passengers of the aircraft.

Two types of atmospheric turbulence are generally the cause of the disruption experienced by an aircraft, namely:
clear sky turbulence, of CAT ("Clear Air Turbulence") type, which represents wind shears which often occur without any visible manifestation, generally above 15 000 feet (about 4500 meters). This clear sky turbulence, which is of non-convective type, usually appears near the tropopause, especially above mountains and especially in winter. Such turbulence presents a natural risk in flight and can bring about injuries to the passengers and flying personnel under certain particularly severe conditions. Moreover, such turbulence gives rise to additional fuel consumption (avoidance of the turbulence zone) and contributes to the fatigue of the aircraft and pilots; and
convective turbulence which is often visible through the presence of clouds. Severe convective turbulence appears in fairly humid regions, so that a radar can generally detect it. So, most of the time, this phenomenon can be avoided by aircraft. However, it may happen that pilots are surprised or that they do not have time to evade a zone of convective turbulence. The severest turbulence appears in storm clouds, with ascending and descending currents that may reach several tens of meters per second. This convective turbulence is very localized and less extensive than clear sky turbulence.

Often, the above phenomena which are localized surprise both the crew of the aircraft and the embedded piloting systems, which do not have time to perform the appropriate maneuvers to attenuate the effects thereof, especially lateral effects, which result therefrom at the aircraft level.

Patent applications FR-05 10341 and WO-2007/042652 disclose a device for attenuating on an aircraft the effects of a vertical turbulence encountered by this aircraft in the course of a flight.

SUMMARY OF THE INVENTION

The object of the present invention is to attenuate exclusively the lateral effects engendered by a turbulence. It is not limited, however, to the aforesaid atmospheric turbulence, but can also relate to wake turbulence which, by definition, may be encountered in the wake of an aircraft, therefore at any altitude. Specifically, the cause of such wake turbulence is not atmospheric phenomena, but the presence of an aircraft preceding the aircraft undergoing the turbulence.

The present invention relates to a method making it possible to automatically attenuate on an aircraft, in particular a transport airplane, the lateral effects engendered by at least one turbulence encountered by this aircraft in the course of a flight.

For this purpose, according to the invention, said method is noteworthy in that in the course of a flight of the aircraft, the following series of successive steps is carried out in an automatic and iterative manner:
a) a roll moment of the aircraft, which is due to the wind, is estimated;
b) the current values of first parameters of the aircraft are measured;
c) with the aid of said estimated roll moment and of said measured current values, as well as of a sideslip value of the aircraft, are calculated:
   a roll control order for at least one first controllable movable member such as an aileron or a spoiler for example, which is able to act on the roll of the aircraft, said roll control order being such that, applied to said first movable member, it makes it possible to minimize on the aircraft the roll-wise disturbances due to the wind; and
   a yaw control order for at least one second controllable movable member such as a fin for example, which is able to act on the yaw of the aircraft, said yaw control order being such that, applied to said second movable member, it makes it possible to compensate on the aircraft for the lateral effects, preferably at one and the same time the lateral effects engendered by the turbulence and the lateral effects engendered by the application of said roll control order to said first movable member; and
d):
   said roll control order is applied to said first movable member; and
   said yaw control order is applied to said second movable member.

Thus, by virtue of the invention, the disturbances in terms of roll moments, as well as the lateral effects, engendered by a turbulence on an aircraft are minimized. This makes it possible in particular to improve the comfort of the pilot and passengers of the aircraft, and to bring about a potential reduction in the number of injured, when the aircraft encounters turbulence.

The present invention applies to all types of turbulence which engenders lateral effects on the aircraft, namely both atmospheric turbulence and wake turbulence.

In a simplified embodiment, said sideslip value is low, thereby making it possible to use simplified calculation formulae in step c) to calculate the roll and yaw control orders, as specified below.

Furthermore, in a preferred embodiment, said sideslip value is calculated previously, before using it in step c) to calculate said control orders.

Accordingly, in a first variant embodiment, the following operations are also carried out in step a):
the current values of second parameters of the aircraft are measured;
with the aid of said measured current values, the horizontal wind existing outside the aircraft at its current position is calculated;

from said horizontal wind thus calculated, the lateral component Vv1 of the wind existing outside the aircraft at its current position is deduced; and said sideslip value βv1 representing the sideslip due to the wind is calculated with the aid of the following expression:

$$\beta v1 = -Vv1/V, V \text{ being the measured air speed of the aircraft.}$$

Furthermore, in a second variant embodiment, in step a):

the sidewind Vv2 existing in front of the aircraft is measured with the aid of an appropriate measurement means onboard the aircraft, in particular a lidar specified below; and the sideslip value βv2 representing the sideslip due to the wind is calculated with the aid of the following expression:

$$\beta v2 = -Vv2/V, V \text{ being the measured air speed of the aircraft.}$$

Additionally, to estimate said roll moment ΔClw due to the wind in step a), in a preferred embodiment:

a global roll moment DCl is determined with the aid of the following expression:

$$DCl = \Delta L/(\rho \cdot V^2 \cdot S \cdot co/2)$$

in which:
ΔL is a coefficient which is calculated on the basis of measured values of parameters of the aircraft;
ρ is the density of the air;
V is the air speed of the aircraft;
S is the surface area of the airfoil of the aircraft; and
co represents the mean aerodynamic chord of the aircraft;

a roll moment ΔClδl which is engendered by the current control of movable members of the aircraft, which act on the roll, is determined; and said roll moment ΔClw (due to the wind) is calculated with the aid of the following expression:

$$\Delta Clw = DCl - \Delta Cl\delta l - \Delta C1, \Delta C1 \text{ being a parameter which is zero or equal to } \Delta C\delta r.$$

Furthermore, in another simplified embodiment, in step a), to estimate said roll moment due to the wind:

the wind at a given distance in front of the aircraft is measured with the aid of an appropriate measurement means onboard the aircraft, in particular a lidar;

a profile of the wind in front of the aircraft is determined with the aid of this measurement; and said roll moment (due to the wind), as well as a sideslip due to the wind, is calculated on the basis of this profile.

Additionally, advantageously, in step c), said roll control order δl and said yaw control order δr are calculated with the aid of the following expressions:

$$\begin{cases} \delta l = [-n\delta r(lp \cdot pv + l\beta v \cdot \beta v)]/(n\delta r \cdot l\delta l - l\delta r \cdot n\delta l) \\ \delta r = -(n\beta v \cdot \beta v + n\delta l \cdot \delta l)/n\delta r \end{cases}$$

in which:
pv is a roll rate due to the wind, which depends in particular on said roll moment due to the wind;
βv is said sideslip value;
lp, lβv, lδl, lδr are roll moment coefficients; and
nβv, nδr, nδl are yaw moment coefficients.

In a preferred embodiment, said roll control order thus calculated is applied to a plurality of first movable members, in particular a plurality of spoilers and/or ailerons.

Furthermore, in a particular embodiment, advantageously: in a step prior to step d):

a characteristic parameter relating to the roll (which varies as a function of the presence of a turbulence and if appropriate of its severity) is determined; and this characteristic parameter is compared with a predetermined threshold value; and in step d), said roll and yaw control orders are applied only if said characteristic parameter is greater than said threshold value.

Thus, by virtue of this particular embodiment, monitoring of the lateral turbulence which acts on said characteristic parameter relating to the roll is carried out, and attenuation of the lateral effects engendered on the aircraft is carried out, only in the event of detecting, in the course of this monitoring, lateral turbulence, that is to say when said characteristic parameter exceeds said threshold value.

The present invention also relates to a device for attenuating on an aircraft, in particular a transport airplane, the lateral effects engendered by at least one turbulence encountered by this aircraft in the course of a flight.

According to the invention, said device is noteworthy in that it comprises:

means for estimating a roll moment of the aircraft, which is due to the wind;

means for measuring the current values of parameters of the aircraft;

means for calculating, with the aid of said estimated roll moment and of said measured current values, as well as of a sideslip value of the aircraft:

a roll control order for at least one first controllable movable member which is able to act on the roll of the aircraft, said roll control order being such that, applied to said first movable member, it makes it possible to minimize on the aircraft the roll-wise disturbances due to the wind; and a yaw control order for at least one second controllable movable member which is able to act on the yaw of the aircraft, said yaw control order being such that, applied to said second movable member, it makes it possible to compensate on the aircraft for the lateral effects due to the wind; and means for applying:
said roll control order to said first movable member; and
said yaw control order to said second movable member.

The present invention also relates to an aircraft system which comprises:

at least one first controllable movable member (but preferably a plurality of first controllable movable members), for example an aileron or a spoiler, which is able to act on the roll of the aircraft;

at least one second controllable movable member, for example a fin, which is able to act on the yaw of the aircraft; and a device such as the aforesaid, for attenuating on the aircraft lateral effects engendered by at least one turbulence encountered by this aircraft in the course of a flight, by determining control orders and by applying them to said first and second movable members.

Furthermore, the present invention also relates to an aircraft which is furnished with a device such as the aforesaid and/or with an aircraft system such as the aforesaid.

The figures of the appended drawing will elucidate the manner in which the invention may be embodied. In these figures, identical references designate similar elements.

DETAILED DESCRIPTION OF THE INVENTION

Figure 1:
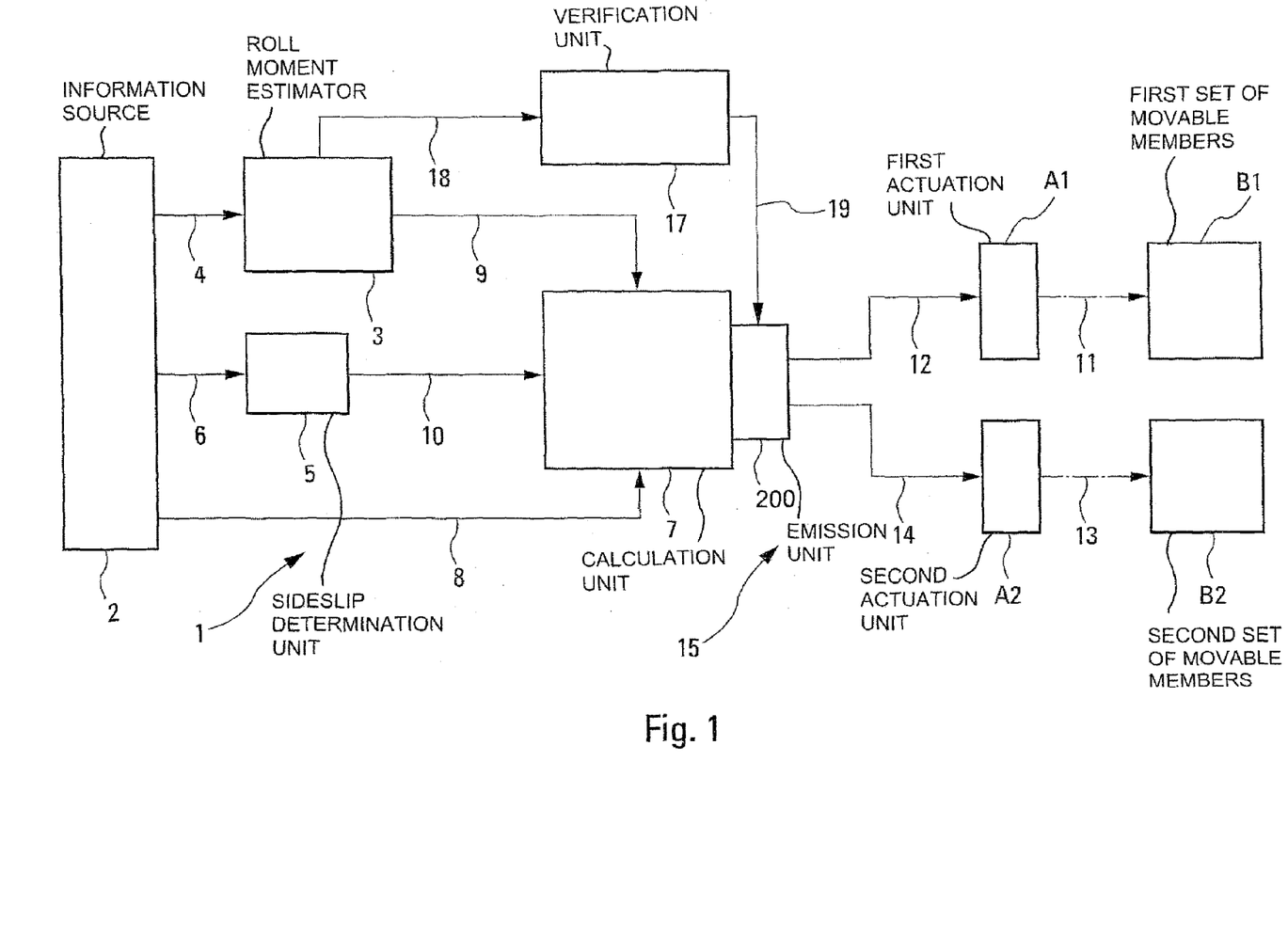
FIG. 1 is the schematic diagram of a device in accordance with the invention.

The device 1 in accordance with the invention and schematically represented in FIG. 1 is intended to be mounted on an aircraft A, for example a transport airplane, to attenuate the lateral effects engendered by at least one turbulence encountered by this aircraft A in the course of a flight.

It is known that turbulence corresponds to an agitation of the air which is superimposed on the mean motion of the air and which consists of haphazard motions, in continual transformation. Turbulence is encountered in the interior or in the vicinity of clouds (for example in a storm cloud where oppositely directed vertical currents coexist). There also exists clear sky turbulence, either near the ground, or at very high altitude in proximity to jet streams.

According to the invention, said device 1 comprises:
- a set 2 of information sources, which comprise routine means for measuring (or calculating) the current values of parameters, specified below, of the aircraft A during a flight;
- means 3 which are connected by way of a link 4 to said set 2 of information sources and which are formed so as to estimate a roll moment of the aircraft A, which is due to the wind (that is to say to a turbulence) encountered by the aircraft in the course of the flight;
- means 5 which are connected by way of a link 6 to said set 2 of information sources and which are formed so as to provide a sideslip value specified below;
- a calculation unit 7 which is connected by way of links 8, 9 and 10 respectively to said set 2, to said means 3 and to said means 5 and which is formed so as to calculate, with the aid of the roll moment estimated by the means 3, of the current values measured by the set 2, and of the sideslip value provided by the means 5:
  - a roll control order for at least one first controllable movable member or control surface) specified below, which is able to act on the roll of the aircraft A. This roll control order is such that, applied to said first movable member, it makes it possible to minimize on the aircraft A the roll-wise disturbances due to the wind; and
  - a yaw control order for at least one second controllable movable member (or control surface), specified below, which is able to act on the yaw of the aircraft A. This yaw control order is such that, applied to said second movable member, it makes it possible to compensate on the aircraft for the lateral effects, namely at one and the same time the lateral effects engendered by the turbulence and the lateral effects engendered by the application of said roll control order to said first movable member;
- a set A1 of actuation means which are able to actuate, that is to say to displace, as illustrated by a chain-dotted link 11, at least one first movable member forming part of a set B1 of one (of) first movable member(s). Said set B1 can comprise one or more first movable members, preferably spoilers 20 and/or ailerons 21 of the aircraft A. Said set A1 receives said roll control order by way of a link 12 from said calculation unit 7, and its actuation means displace the first movable member or members of said set B1, in a routine manner, in accordance with said roll control order; and
- a set A2 of actuation means which are able to actuate, that is to say to displace, as illustrated by a chain-dotted link 13, at least one second movable member forming part of a set B2 of one (of) second movable member(s). Said set B2 can comprise one or more second movable members.

It comprises, preferably, a fin 22. Said set A2 receives said yaw control order by way of a link 14 from said calculation unit 7, and its actuation means displace the second movable member or members of said set B2, in a routine manner, in accordance with said roll control order.

In a particular embodiment, said device 1 forms part, as well as said sets B1 and B2, of a system 15 which is onboard the aircraft A. The processing (measurements, calculations, applications of orders, etc.) implemented by said device 1 is carried out in real time.

Furthermore, in a preferred embodiment, said device 1 is formed so as to apply said roll control order to a plurality of first movable members, in particular to a plurality of spoilers 20 and/or ailerons 21.

The device 1 in accordance with the invention is therefore formed so as to minimize the disturbances in terms of roll moments, as well as the lateral effects, engendered by a turbulence on the aircraft A. This makes it possible in particular to improve the comfort of the pilot and passengers of the aircraft A, and to bring about a potential reduction in the number of injured, when the aircraft A encounters turbulence.

It will be noted that the yaw control order which is applied to the second movable member makes it possible to compensate at one and the same time for the lateral effects engendered by the turbulence and the lateral effects engendered by the application of said roll control order to said first movable member. It therefore has a dual function: to reduce the effects of the turbulence and to compensate for the effects induced by the roll control.

Said device 1 applies to all types of turbulence which engender lateral effects on the aircraft, namely both atmospheric turbulence and wake turbulence.

In a first embodiment, said means 3 which are intended to estimate the roll moment $\Delta Clw$ due to the wind, comprise the following elements (integrated and not represented):
- a first element for determining inertias of the aircraft A, as a function of its mass and of its centering (which are determined in a routine manner by means forming part of said set 2), as well as tabulated data;
- a second element for determining a global roll moment DCl, with the aid of the following expression:

$$DCl = \Delta L / (\rho \cdot V^2 \cdot S \cdot co/2)$$

in which:
- $\Delta L$ is a coefficient specified below, which is calculated on the basis of measured values of parameters of the aircraft A and of the inertias determined by said first element;
- $\rho$ is the density of the air;
- V is the air speed of the aircraft A;
- S is the surface area of the airfoil of the aircraft A; and
- co represents the mean aerodynamic chord of the aircraft A;
- a third element for determining a roll moment $\Delta Cl\delta l$ which is engendered by the current control of movable members (spoilers, ailerons, etc.) of the aircraft A, which act on its roll; and
- a fourth element for calculating said roll moment $\Delta Clw$ with the aid of the following expression:

$$\Delta Clw = DCl - \Delta Cl\delta l.$$

Ideally, said fourth element would also be able to calculate the roll moment $\Delta Clw$ with the aid of the following expression:

$$\Delta Clw = DCl - \Delta Cl\delta l - \Delta C\delta r.$$

Figure 2:
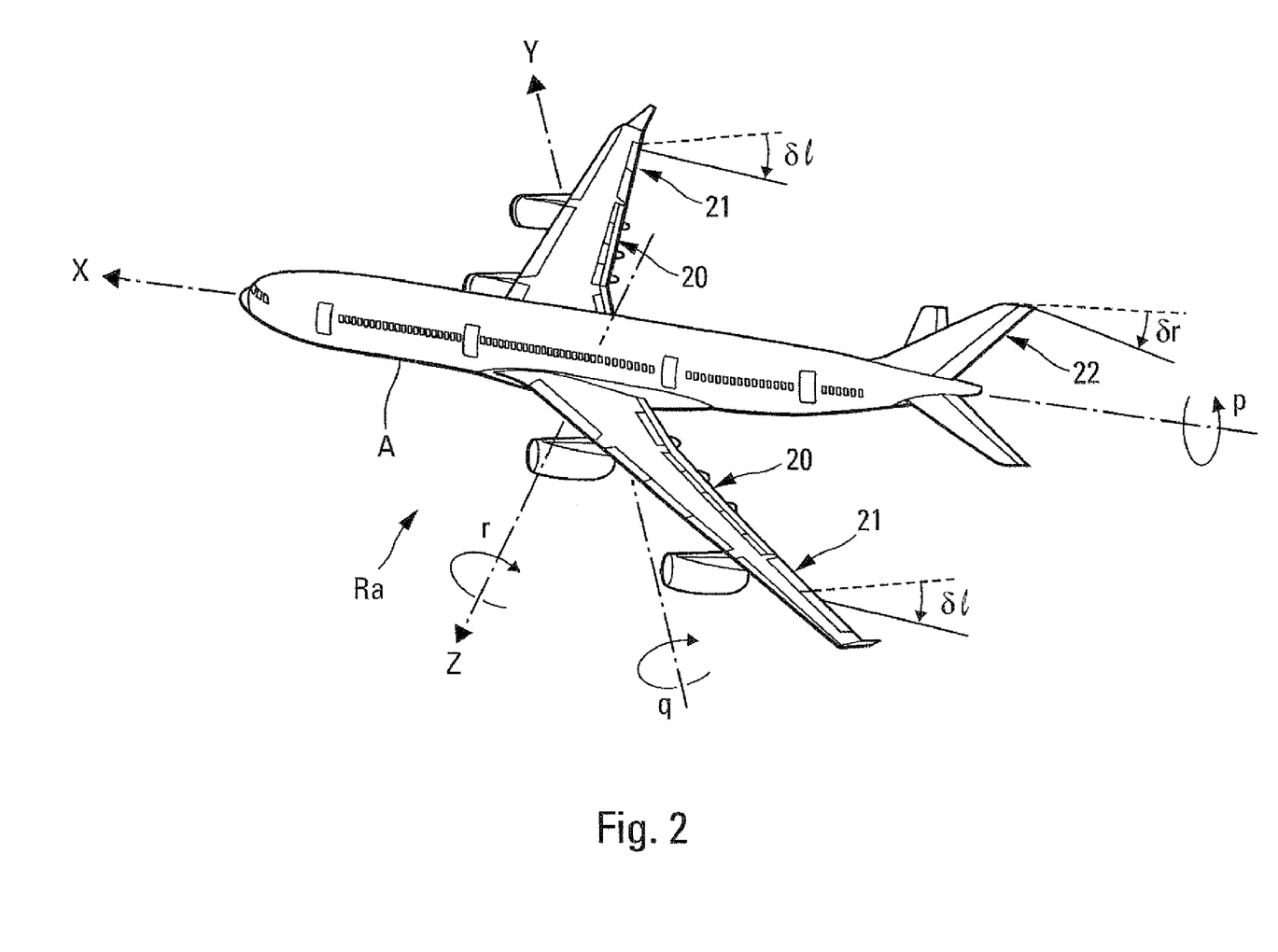
FIG. 2 is a diagram showing an aircraft on which the various axes of motion have been represented.

For this purpose, it will be noted that on the basis of the moment equations for an aircraft A in a roll, it is possible to define the roll moment in the following manner:

p, q, r are the angular rates (respectively of roll, pitch and yaw) about the axes X, Y, Z of the aircraft A, as represented in FIG. 2. These angular rates are measured with the aid of routine gyrometers forming part of the set 2. These axes X, Y, Z are the axes of a reference frame Ra tied to the aircraft A. More precisely:

X is defined along the longitudinal axis of the aircraft A;
Y is orthogonal to the X axis and passes through the mid-plane of the wings of the aircraft A; and
Z is perpendicular to the XY plane formed by the X and Y axes and it passes through the center of gravity of the aircraft A;

lx, ly, lz and lxz denote the inertias respectively in relation to the X, Y, Z axes and in relation to the XZ plane of the aircraft A, which are calculated in a routine manner; one obtains:

$$L = p1 \cdot lx - lxz \cdot (p \cdot q + r1) + q \cdot r \cdot (lx - ly), p1 \text{ and } r1 \text{ being the derivatives with respect to time of } p \text{ and } r;$$

for small disturbances, the following assumption can be made:

$$\Delta L = p1 \cdot lx - r1 \cdot lxz$$

the global roll moment can be deduced as a function of ρ (density of the air), S (surface area of the airfoil), co (mean aerodynamic chord), and V (air speed of the aircraft A), by using the following expression:

$$DCl = \Delta L / (\rho \cdot V^2 \cdot S \cdot co/2);$$

when the aircraft A is in operation, the flight control loops or the maneuvers may, by way of the control surfaces, also create roll moments. The flight controls governing the wind, the supplement to be countered will be determined. This therefore involves deducing from the global roll moment DCl, the roll moment ΔClδl due to the control surfaces of the aircraft A which are already in motion (function of parameters such as the Mach number and the aerodynamic configuration):

$$\Delta Clw = DCl - \Delta Cl\delta l \text{ or } \Delta Clw = DCl - \Delta Cl\delta l - \Delta C\delta r;$$

the roll moment due to the wind ΔClw thus obtained has not yet been countered and it must be countered by the flight controls and the control surfaces.

Furthermore, in a second embodiment, said means 3 comprise, for estimating said roll moment due to the wind, the following elements (integrated and not represented):

a first element for determining on the basis of a measurement of the wind at a given distance in front of the aircraft A, which is carried out with the aid of an appropriate measurement means onboard the aircraft A, preferably a rider, a profile of the wind in front of the aircraft A; and a second element for calculating, on the basis of this profile of the wind in front of the aircraft A, said roll moment.

It is known that a lidar (not represented) is a device making it possible to determine the position and the distance of an obstacle by reflection on the latter of an optical luminous radiation, generally emitted by a laser. The term lidar stems from the abbreviation of the expression "light detection and ranging". The principle of the lidar relies on a transposition into the luminous or optical domain of the principle of a radar applied in the radioelectric domain.

In a particular embodiment, the lidar carries out a measurement of the vertical wind at a given distance in front of the aircraft A, for example at five points, including a point in front of the aircraft A on the X axis of its fuselage, two points at the center of each half-airfoil, and two points at the ends of each half-airfoil, at a predetermined distance which varies between a few meters and a hundred meters in front of the aircraft. Patent applications FR-05 03128 and WO-2006/103325 disclose devices for measuring turbulence using such lidars.

On the basis of the measurements carried out by the lidar, a wind profile in front of the aircraft A is defined by said first element (of said means 3), and a roll moment can therefore be estimated by said second element (of said means 3). It will be noted that on the basis of the lift coefficient Cza and of the lift distribution law for the wing, it is possible to determine the roll moment Lw on the basis of the profile of the wind, with the aid of the following expression:

$$Lw = -[(\rho \cdot V^2 \cdot Cza)/2] \cdot \int_{-b/2}^{b/2} y \cdot c(y) \cdot d\alpha \cdot dy$$

in which:

dα is the variation in incidence on the airfoil due to the disturbance;
y is the displacement of the wind along the Y axis, representing said profile of the wind;
c(y) is the lift distribution law; and
b is the wingspan.

Additionally, to estimate the sideslip value βv1 which is provided to said calculation unit 7, in a preferred embodiment:

said set 2 (or said means 5) comprise means (not represented) for:
  measuring the current values of parameters of the aircraft A; and
  calculating, in a routine manner, with the aid of said measured current values, the horizontal wind existing outside the aircraft A at its current position; and said means 5 comprise means (not represented) for:
  deducing from said horizontal wind thus calculated, the lateral component Vv1 (that is to say the component along the Y axis of the reference frame Ra) of the wind existing outside the aircraft A at its current position; and
  calculating said sideslip value βv1 representing the sideslip due to the wind, with the aid of the following expression:

$$\beta v1 = -Vv1/V.$$

It will be noted that the calculation of the horizontal wind makes it necessary to ascertain the following magnitudes:

the accelerations of the aircraft A along the three axes X, Y and Z, the ground speed, the angles of attitude and the angle rates being provided by the inertial platforms of the aircraft A, forming part of said set 2;
the air speed V which can be provided by a routine air data system, which also forms part of said set 2;
the incidence which is calculated, in a routine manner, by said means 5 or by means forming part of said set 2; and
the sideslip which is estimated or measured.

The three components of the wind are therefore calculated in the reference frame Ra tied to the aircraft A, on the basis of the ground speed, air speed, incidence and sideslip. Two horizontal components (along the X and Y axes) and a vertical component are therefore retrieved. The calculation of the wind must be performed at a fairly fast pace (at least eight points per second).

Furthermore, in a particular embodiment, to estimate the sideslip value βv2:
the set 2 comprises an appropriate measurement means, in particular a lidar such as the aforesaid, for measuring the sidewind Vv2 existing in front of the aircraft A; and
said means 5 are formed so as to calculate the sideslip value βv2 representing the sideslip due to the wind, with the aid of the following expression:

$\beta v2 = -Vv2/V$, $V$ being the measured air speed of the aircraft $A$.

Additionally, said calculation unit 7 calculates said roll control order δl and said yaw control order δr, with the aid of the following expressions:

$$\begin{cases} \delta l = [-n\delta r(lp \cdot pv + l\beta v \cdot \beta v)]/(n\delta r \cdot l\delta l - l\delta r \cdot n\delta l) \\ \delta r = -(n\beta v \cdot \beta v + n\delta l \cdot \delta l)/n\delta r \end{cases}$$

in which:
pv is a roll rate due to the wind;
βv is said sideslip value and corresponds, as a function of the embodiment used, to βv1 or βv2;
lp, lβv, lδl, lδr are roll moment coefficients; and
nβv, nδr, nδl are yaw moment coefficients.

The mode of calculation of the aforesaid orders δl and δr is specified hereinafter. On the basis of the estimation of the sideslip due to the wind βv and of the estimation of the roll moment due to the wind pv, the objective is to find a pair of orders in terms of roll moment δl (with preferably the ailerons 21) and in terms of yaw moment δr (with the fin 22) so as to solve the linearized lateral flight mechanics equations (p and r=0).

It is known that the wind disturbed system may be written in the following manner:

$$\begin{pmatrix} \beta 1 \\ r1 \\ p1 \\ \phi 1 \end{pmatrix} = A \begin{pmatrix} \beta \\ r \\ p \\ \phi \end{pmatrix} + B \begin{pmatrix} \delta l \\ \delta r \end{pmatrix} + Bv \begin{pmatrix} pv \\ \beta v \end{pmatrix}$$

$$\begin{pmatrix} \beta 1 \\ r1 \\ p1 \\ \phi 1 \end{pmatrix} = \begin{pmatrix} \frac{Y\beta}{V} & -\cos\alpha & \sin\alpha & \frac{g \cdot \cos\theta}{V} \\ n\beta & nr & np & 0 \\ l\beta & lr & lp & 0 \\ 0 & tg\theta & l & 0 \end{pmatrix} \begin{pmatrix} \beta \\ r \\ p \\ \phi \end{pmatrix} +$$

$$\begin{pmatrix} \frac{Y\delta l}{V} & \frac{Y\delta r}{V} \\ n\delta l & n\delta r \\ l\delta l & l\delta r \\ 0 & 0 \end{pmatrix} \begin{pmatrix} \delta l \\ \delta r \end{pmatrix} + \begin{pmatrix} \frac{Y\beta v}{V} & \frac{Ypv}{V} \\ n\beta v & npv \\ l\beta v & lpv \\ 0 & 0 \end{pmatrix} \begin{pmatrix} \beta v \\ pv \end{pmatrix}$$

According to the invention, orders dependent on the parameters pv and βv and on certain aerodynamic coefficients are dispatched to the movable members of the sets B1 and B2 of the aircraft A so as to minimize the effects in terms of roll and yaw (p and r=0). The following parameters are taken into account:
β the sideslip of the aircraft A;
φ the roll of the aircraft A;
α a the incidence of the aircraft A;
θ the attitude of the aircraft A;

β1, r1, p1 and φ1 the derivatives with respect to time of the parameters β, r, p and φ;
V the air speed; and
g the gravity constant.

Moreover, the coefficients entering the calculation are the following:
the roll moment coefficient due to a roll order lδl;
the roll moment coefficient due to a yaw order lδr;
the roll moment coefficient due to the roll moment due to the wind lpv;
the roll moment coefficient due to the sideslip due to the wind lβv;
the yaw moment coefficient due to a roll order nδl;
the yaw moment coefficient due to a yaw order nδn; and
the yaw moment coefficient due to the sideslip due to the wind nβv.

The yaw moment coefficient due to the roll moment due to the wind is judged negligible.

A filter can be added to the orders, as well as a gain dependent on the movable members (or control surfaces) used. A filter can make it possible to filter the high frequencies that are physically inaccessible to the movable members used. It also makes it possible not to excite the structure of the aircraft A. It can also afford a phase advance to counter the delay at activation, the delay in estimating the roll moment and the delay engendered by the systems for the calculation of the algorithm. The aim to be obtained is that the physical effect of the wind on the aircraft A and the physical effect engendered by the movable members should be in phase so as to counter the disturbance in an optimal manner. The gains of the global orders in terms of roll and yaw are therefore (on the basis of the above equations) of the form:

$$\begin{cases} \delta l = [-n\delta r(lp \cdot pv + l\beta v \cdot \beta v)]/(n\delta r \cdot l\delta l - l\delta r \cdot n\delta l) \\ \delta r = -(n\beta v \cdot \beta v + n\delta l \cdot \delta l)/n\delta r \end{cases}$$

The yaw order is dependent on the roll order. Moreover, as indicated above, the roll order δl can, for example, be converted into orders for the ailerons 21 and/or the spoilers 20, and the yaw order δr is converted, preferably, into an order for the fin 22.

An alternative which consists in controlling only roll moments due to the wind amounts to introducing (through the means 5) a zero sideslip value βv into the orders. In this case, the device 1 counters the roll effects due to the wind, and it compensates only for the yaw effects related to the use of the first movable members. The global roll order, as a function of its amplitude, is thereafter applied to the first movable members, and the yaw order is applied to the fin.

Additionally, in a particular embodiment said device 1 comprises, moreover, activation means 17 which are connected by way of a link 18 to said means 3 and which verify whether activation conditions are satisfied. These activation means 17 are also connected by way of a link 19 to an emission means 200 associated with said calculation unit 7. This emission means 200 dispatches the control orders determined by the calculation unit 7 to said sets A1 and A2 only when the activation means 17 indicate that all the activation conditions hold and authorize this dispatch.

In a particular embodiment, said activation means 17:
determine a characteristic parameter relating to the roll (which varies as a function of the presence of a turbulence, and if appropriate, of its severity); and
compare this characteristic parameter with a predetermined threshold value.

In this case, the device 1 applies said roll and yaw control orders, only if said characteristic parameter is greater than said threshold value.

Said characteristic parameter can be a roll rate. In this case, on the basis of a roll coefficient due to the roll rate Clp, it is possible to determine the roll rate pv due to the wind with the aid of the following expression:

$$pv = \Delta Clw \cdot V/Clp \cdot co$$

It is also possible to use the roll moment as characteristic parameter. A roll rate is however easier to apprehend than a roll moment.

When the activation of the turbulence is canceled, all the orders are progressively canceled, and the movable members 20, 21, 22 used return progressively to a neutral position.

The invention claimed is:

1. A method for attenuating lateral effects on an aircraft due to turbulence encountered by the aircraft during flight, the method comprising the steps of:
   a) estimating, by a roll moment estimator, a roll moment of the aircraft due to wind;
   b) measuring current values of first aircraft parameters;
   c) calculating, by a calculating unit, based on said estimated roll moment and said measured current values, the following:
      a roll control order to control at least one first controllable movable member to act on aircraft roll, said roll control order applied to said first movable member to minimize aircraft roll-wise disturbances due to wind; and
      a yaw control order to control at least one second controllable movable member to act on aircraft yaw; wherein:
      said roll control order is applied to said first movable member,
      said yaw control order is applied to said second movable member, and
   in step c):
      said roll and yaw control orders are calculated based on a sideslip value representing sideslip value of the aircraft due to the wind; and
      said yaw control order is calculated as a function of said roll control order so that said yaw control order compensates for aircraft lateral effects due to turbulence and lateral effects due to application of said roll control order to said first movable member,
   wherein in step a), to estimate said roll moment due to the wind:
   a global roll moment DCl is determined with the aid of the following expression:

$$DCl = \Delta L/(\rho \cdot V^2 \cdot S \cdot co/2) \text{ in which:}$$

$\Delta L$ is a coefficient which is calculated on the basis of measured values of parameters of the aircraft;
   $\rho$ is the density of the air;
   $V$ is the air speed of the aircraft;
   $S$ is the surface area of the airfoil of the aircraft; and
   co represents the mean aerodynamic chord of the aircraft;
   a roll moment $\Delta Cl\delta l$ which is engendered by the current control of movable members of the aircraft, which act on the roll, is determined; and
   said roll moment $\Delta ClW$ is calculated with the aid of the following expression:

$$\Delta Clw = DCl - \Delta Cl\delta l.$$

2. The method as claimed in claim 1, wherein:
in step a), the following operations are further carried out:
   current values of second parameters of the aircraft are measured;
   based on said measured current values of said second parameters, horizontal wind existing outside the aircraft at a current position of the aircraft is calculated;
   based on said calculated horizontal wind, a lateral component Vv1 of wind existing outside the aircraft at the current position is deduced; and
   said sideslip value representing sideslip due to the wind is calculated according to the following expression:

$$\beta v1 = -Vv1/V, \ V \text{ being a measured air speed of the aircraft, where } \beta v1 \text{ is the sideslip value; and}$$

in step c), the sideslip value is applied to calculate said control orders.

3. The method as claimed in claim 1, wherein:
in step a):
   a sidewind Vv2 existing in front of the aircraft is measured by a measurement unit onboard the aircraft; and
   a sideslip value $\beta v2$ representing sideslip due to the wind is calculated according to the following expression:

$$\beta v2 = -Vv2/V, \ V \text{ being a measured air speed of the aircraft; and}$$

in step c), the sideslip value $\beta v2$ is applied to calculate said control orders.

4. The method as claimed in claim 1, wherein:
a characteristic parameter relating to the roll is determined; and
the characteristic parameter is compared with a threshold value; and
said roll and yaw control orders are applied when said characteristic parameter is greater than said threshold value.

5. A method for attenuating lateral effects on an aircraft due to turbulence encountered by the aircraft during flight, the method comprising the steps of:
   a) estimating, by a roll moment estimator, a roll moment of the aircraft due to wind;
   b) measuring current values of first aircraft parameters;
   c) calculating, by a calculating unit, based on said estimated roll moment and said measured current values, the following:
      a roll control order to control at least one first controllable movable member to act on aircraft roll, said roll control order applied to said first movable member to minimize aircraft roll-wise disturbances due to wind; and
      a yaw control order to control at least one second controllable movable member to act on aircraft yaw; wherein:
      said roll control order is applied to said first movable member,
      said yaw control order is applied to said second movable member, and
   in step c):
      said roll and yaw control orders are calculated based on a sideslip value of the aircraft; and
      said yaw control order is calculated as a function of said roll control order so that said yaw control order compensates for aircraft lateral effects due to turbulence and lateral effects due to application of said roll control order to said first movable member, wherein in step a), to estimate said roll moment due to the wind:
wind at a given distance in front of the aircraft is measured with the aid of an appropriate measurement means onboard the aircraft;
a profile of the wind in front of the aircraft is determined with the aid of this measurement; and
said roll moment is calculated on the basis of this profile.

6. The method as claimed in claim 5, wherein:
in step a), the following operations are further carried out:
current values of second parameters of the aircraft are measured;
based on said measured current values of said second parameters, horizontal wind existing outside the aircraft at a current position of the aircraft is calculated;
based on said calculated horizontal wind, a lateral component Vv1 of wind existing outside the aircraft at the current position is deduced; and
said sideslip value representing sideslip due to the wind is calculated according to the following expression:

$\beta v1 = -Vv1/V$, $V$ being a measured air speed of the aircraft, where $\beta v1$ is the sideslip value; and in step c), the sideslip value is applied to calculate said control orders.

7. The method as claimed in claim 5, wherein:
in step a):
a sidewind Vv2 existing in front of the aircraft is measured by a measurement unit onboard the aircraft; and
a sideslip value $\beta v2$ representing sideslip due to the wind is calculated according to the following expression:

$\beta v2 = -Vv2/V$, $V$ being a measured air speed of the aircraft; and in step c), the sideslip value $\beta v2$ is applied to calculate said control orders.

8. The method as claimed in claim 5, wherein:
a characteristic parameter relating to the roll is determined; and
the characteristic parameter is compared with a threshold value; and
said roll and yaw control orders are applied when said characteristic parameter is greater than said threshold value.

9. A method for attenuating lateral effects on an aircraft due to turbulence encountered by the aircraft during flight, the method comprising the steps of:
a) estimating, by a roll moment estimator, a roll moment of the aircraft due to wind;
b) measuring current values of first aircraft parameters;
c) calculating, by a calculating unit, based on said estimated roll moment and said measured current values, the following:
a roll control order to control at least one first controllable movable member to act on aircraft roll, said roll control order applied to said first movable member to minimize aircraft roll-wise disturbances due to wind; and
a yaw control order to control at least one second controllable movable member to act on aircraft yaw; wherein:
said roll control order is applied to said first movable member,
said yaw control order is applied to said second movable member, and
in step c):
said roll and yaw control orders are calculated based on a sideslip value of the aircraft; and
said yaw control order is calculated as a function of said roll control order so that said yaw control order compensates for aircraft lateral effects due to turbulence and lateral effects due to application of said roll control order to said first movable member,
wherein in step c), said roll control order and said yaw control order are calculated with the aid of the following expressions:

$\delta l = [-n\delta r(lp \cdot pv + l\beta v \cdot \beta v)]/(n\delta r \cdot l\delta l - l\delta r \cdot n\delta l)$ $\delta r = -(n\beta v \cdot \beta v + n\delta l \cdot \delta l)/n\delta r$ in which:
$\delta l$ is the roll control order,
$\delta r$ is the yaw control order,
pv is a roll rate due to the wind;
$\beta v$ is said sideslip value;
lp, l$\beta$v, l$\delta$l, l$\delta$r are roll moment coefficients; and
n$\beta$v, n$\delta$r, n$\delta$l are yaw moment coefficients.

10. The method as claimed in claim 9, wherein:
in step a), the following operations are further carried out:
current values of second parameters of the aircraft are measured;
based on said measured current values of said second parameters, horizontal wind existing outside the aircraft at a current position of the aircraft is calculated;
based on said calculated horizontal wind, a lateral component Vv1 of wind existing outside the aircraft at the current position is deduced; and
said sideslip value representing sideslip due to the wind is calculated according to the following expression:

$\beta v1 = -Vv1/V$, $V$ being a measured air speed of the aircraft, where $\beta v1$ is the sideslip value; and in step c), the sideslip value is applied to calculate said control orders.

11. The method as claimed in claim 9, wherein:
in step a):
a sidewind Vv2 existing in front of the aircraft is measured by a measurement unit onboard the aircraft; and
a sideslip value $\beta v2$ representing sideslip due to the wind is calculated according to the following expression:

$\beta v2 = -Vv2/V$, $V$ being a measured air speed of the aircraft; and in step c), the sideslip value is applied to calculate said control orders.

12. The method as claimed in claim 9, wherein:
a characteristic parameter relating to the roll is determined; and
the characteristic parameter is compared with a threshold value; and
said roll and yaw control orders are applied when said characteristic parameter is greater than said threshold value.

* * * * *